Patented Nov. 13, 1945

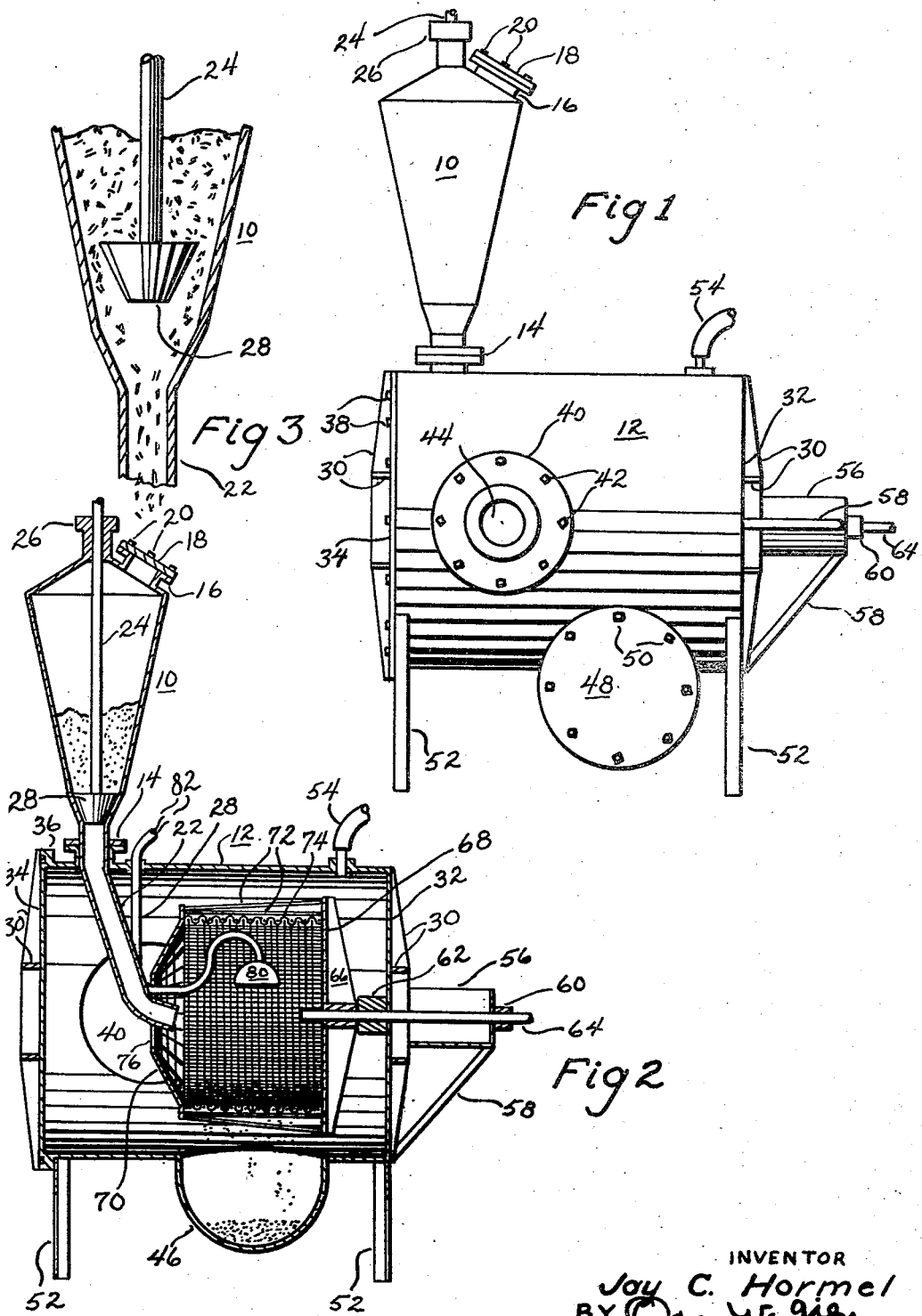

2,388,917

UNITED STATES PATENT OFFICE 2,388,917

PROCESS FOR PRESERVATION OF BIOLOGICAL MATERIALS AND PRODUCTS RESULTING THEREFROM

Jay C. Hormel, Austin, Minn., assignor to Geo. A. Hormel & Co., Austin, Minn., a corporation of Delaware Application October 13, 1941, Serial No. 414,772

21 Claims. (Cl. 99—199)

This invention relates to the preservation of biological substances, and more particularly to their desiccation in vacuo by sublimation while they are in the frozen state so that they may be preserved indefinitely at room temperature while excluded from air and moisture, and so that the preserved material may be restored to its original hydrated condition simply by addition of water. The process is especially adapted for treatment of normally liquid or semi-liquid proteinous food products.

It is a broad object of the invention to provide an improved process of the type above referred to which, when applied to food products, produces a dehydrated substance that upon being reconstituted has the same appearance, condition and flavor as the original starting material, it being especially noted that it is an object to preserve the flavor substantially without loss or deterioration.

A further object is to dehydrate proteinous food materials without the protein becoming denatured as by overheating, ebullition, or other causes.

Another broad object of the invention resides in the provision of a process of dehydrating biological material by sublimation from the frozen state wherein the dehydrated material produced in the process is rapidly removed from the frozen body of starting material, and is preferably removed substantially as fast as formed. More specifically the invention contemplates dehydrating the biological substances while in the form of relatively small frozen bodies such as flakes or chips, and while continuously removing the dehydrated material from the flakes or chips substantially as fast as formed.

Again, it is an object of the invention to dry biological substances, particularly proteinous foods, under the influence of infra-red rays while maintaining the starting material in the frozen state and while removing the dried substances from the frozen starting material and out of the influence of the infra-red rays substantially as fast as formed.

Other objects of the invention include provision of such a process which does not require a chemical agent for its operation; and the provision of a useful, powdered, proteinous product which may be readily packaged to eliminate rancidification, bacterial action or other biological or chemical denaturing.

These and other objects of the invention will become more readily apparent upon a detailed study of the specification, together with the appended claims and the drawing.

Briefly stated, the process is preferably carried out by first forming relatively small frozen bodies of the biological substance being treated, in the form of chips or flakes produced in a standard flake ice machine of the type used in the produce of ice flakes used for refrigerating and packing purposes. The frozen chips or flakes are then subjected to conditions which will result in the sublimation of moisture therefrom, whereby a film of dried material is formed on each of the flakes. This dried material is preferably removed substantially as fast as formed so that succeeding films may be rapidly produced. This may be accomplished, for example, by moderately agitating the frozen chips during the sublimation of the moisture to knock off the dried film in the form of a powder and permitting this powder to fall away out of contact with the frozen chips as through a suitable screen. The process is continued until the chips gradually reduce in size and are wholly converted to the dehydrated powder, the sublimed moisture being continuously removed all the while during the process. Heat to effect sublimation is applied to the chips during the process and the dried powder is preferably moved substantially out of the influence of this heat upon being removed from the frozen chips, thereby to prevent scorching thereof with consequent flavor deterioration. The conditions of treatment are preferably such that no melting or ebullition of the material occurs during the process.

The drawing illustrates one form of apparatus which may be used in carrying out the process of the invention, and in the drawing Figure 1 illustrates a side elevation of the apparatus;

Figure 2 is a vertical section of the same view as in Figure 1; and

Figure 3 is a detailed enlarged section showing the feed valve in open position.

A feed hopper is indicated generally at 10 and the body of the dryer at 12. The hopper 10 is an enclosed, conical steel member which is mounted on the body of the dryer and connects therewith through an air-tight joint 14. At the upper end of the hopper is a port 16 through which material to be dried may be introduced. A cover plate 18 is bolted thereto by means of bolts 20 and a vacuum tight seal is maintained. At its lower extremity the hopper 10 has a bent chute 22 which extends downwardly into the dryer 12. Centrally disposed within the hopper 10 is a valve rod 24 which may be moved vertically through the bearing 26 at the central top portion of the hopper 10. At the lower end of the rod 24 is a valve member 28 which is beveled to fit a corresponding portion of the hopper 10. Bearing 26 makes a vacuum-tight connection with valve rod 24.

As shown, the body of the dryer 12 is a cylindrical steel member with both ends reenforced by ribs 30. One end 32 is preferably integral with the cylindrical body 12 while the other corresponding end 34 is removable therefrom in the form of a door. The end 34 is bolted to the flanged portion 36 of the body 12 by means of bolts 38 to form a vacuum-tight fit. Two cover plates 40 are attached to the body 12 of the dryer and are oppositely disposed. The covers are sealed by means of bolts 42 to form also a vacuum-tight fit. At the center of each cover plate 40 is a glass peephole 44 to allow the operator to observe the operation of the process. At the bottom of the dryer is a well 46, shown in Figure 2, to which is attached a cover 48 by means of bolts 50. Legs 52 support the entire assembly. A connection 54 leads to a suitable source of vacuum, not shown, so that the entire assembly, including the hopper 10, may be evacuated of air. Attached to the end 32 of the dryer is a bearing box 56 which is further supported by the braces 58. A bearing 60 is attached to the outer end of the box 56 and another bearing 62 is attached to the inner wall of the end 32 so as to journal the shaft 64 therein. The shaft 64 is connected with a suitable source of driving power, not shown, to rotate it at the desired speed.

At the end of the shaft 64 extending within the dryer 12 is mounted a cylindrical drum member 66, shown in section in Figure 2. The shaft 64 is attached to the center of a circular reenforced steel plate 68 to which, in turn, is attached a conical plate 70 at the other end of said drum member 66 by means of rods 72. A screen 74 forms the cylindrical walls of the drum so that material falling therethrough will pass between the rods 72 and into the well 46 at the bottom of the dryer. The conical plate 70 has a central opening 76 into which the chute 22 from the hopper 10 extends. An electric conduit 78 extends through the dryer top and into the same central opening 76 in the conical end of the drum 66. The conduit 78 terminates in one or more infrared lamps 80 whose rays are directed upon the material within the drum 66. These lamps are preferably of the well-known type provided with built-in reflector, but separate reflectors for reflecting the rays downwardly may be provided if desired. Shield means may be provided to prevent particles from coming in contact with the lamp. The electric leads 82 connect with a suitable source of electricity for producing the infrared rays.

In performing the process of drying by this invention, the atmosphere in and about the apparatus is lowered to a temperature below the freezing point of the substance to be volatilized. Frozen particles of the substance to be dried are then introduced in chip or flake form through the port 16 until the hopper 10 is filled to the desired depth. The cover plate 18 is placed over the port and is attached to form a vacuum-tight seal. The source for evacuating the dryer is set in operation and the infra-red lamps are energized. The motor for revolving the drum 66 is started and a charge of material is allowed to fall from the hopper 10 into the drum 66.

To feed the drum 66 with a charge of material to be dried, the valve rod 24 is raised by hand or through some mechanism not shown. The valve will be unseated as shown in Figure 3, and the frozen particles contained in the hopper will flow through the pipe 22 into the drum 66. When a sufficient charge has flowed through, the valve 28 is again closed.

The infra-red rays emitted from the lamp 80 furnish the heat for volatilizing the water from the substance to be dried without heating the interior of the particles. A coating of dried material forms on the particles and this coating is removed under the tumbling action of the drum as fast as it is formed, thus preventing any portion of the material from being subjected for an unduly long period to the direct action of the infra-red rays. Burning of the material is obviated by the instantaneous removal of the powder as soon as it is dried. By virtue of the quick removal of the dried material, the undried material may be subjected to a stronger ray, thus speeding up the process.

The dried powder collects in the well 46 as it falls through the screen 74. When it is desired to remove the dried powder the vacuum seal is broken in line 54 and air or an inert gas such as nitrogen is allowed to rush into the dryer. The cover plate 48 is removed and the powder withdrawn from the well 46.

In carrying out the process, the pressure in the dryer is maintained below the equilibrium vapor pressure of the frozen material being dried and may be as far below as desired.

The temperature of the frozen chips or flakes must be maintained below that of their melting point which is fixed for any given material under treatment. In practice it has been found desirable to mount the entire apparatus in a room maintained well below freezing temperature as this obviates necessity for special refrigeration means for the dryer and its hopper, and further facilitates storage and handling of frozen chips prior to treatment. As an example, the room may be maintained at a temperature of about five degrees above zero Fahrenheit in the treatment of ordinary proteinous food materials and preferably this temperature should not rise above about 25° F.

The temperature of the flakes or chips in the process is not only a function of the room temperature in which the apparatus is mounted, but is moreover dependent on the amount of heat supplied thereto by the infra-red lamps as related to the capacity of the system for withdrawing the sublimed water vapor. Care must therefore be taken that there is such a relationship between the heating capacity of the infra-red lamps and the water vapor withdrawal capacity of the system as to insure that the temperature of the frozen chips or flakes will not rise above their melting point as will be obvious to those skilled in the art. This is a subject of mathematical determination obtained from the fact the lamps must supply approximately 1200 B. t. u. per pound of water removed in the process, plus allowance for efficiency loss due to absorption of heat by the apparatus itself and radiation losses, and the rated capacity of the system to remove water vapor.

The vacuum in the dryer is preferably produced by means of a steam ejector vacuum pump connected to the connection 54 of the dryer. Such vacuum producing means results in direct and simple withdrawal of the sublimed water vapor which is commingled with the cooling water of the pump, and obviates the necessity for chemical drying agents. While it is theoretically and actually possible to carry out the process at somewhat higher pressures as will be evident to those skilled in the art, it is desirable to carry out the process at pressures lower than approximately 1000 microns in the treatment of proteinous food substances as for example broths, eggs, whole milk, etc. The preferred range of pressures to be employed is from 100 to 500 microns, it being understood that the pressures are subjected to considerable variation depending on the particular material under treatment. It should be noted, however, that the pressure should be below the equilibrium vapor pressure of the frozen material being dried, as previously stated.

The chips or flakes in the rotating screen drum 66 must not be excessively agitated for otherwise they will have a tendency to pulverize, at least in substantial part, and drop through the screen 72 into the receiving well 46 without moisture removal. Therefore, the drum should be rotated only at moderate speed, as for example a speed of the order of 4 R. P. M. or less. Further, the rotating screen drum should not be overloaded with frozen chips or flakes at any time, but is preferably loaded with only about twenty per cent of its volume capacity. If it is over-loaded, there is a tendency for the chips to be carried up to the top and dropped down with sharp impact having a tendency to pulverize. And, moreover, such chips may drop on the infra-red lamps 80 and damage the same, especially in view of the temperature differences involved. In this connection it should be further noted that the interior of the screen 74 should be smooth to prevent raising of the chips even at low speeds of rotation.

Moreover, it should be noted that there should preferably be a sufficient amount of chips in the screen at all times to keep the lower portions thereof covered. Otherwise, the infra-red rays will pass directly through the screen and onto the dried material in the well, thereby tending to scorch the same.

The screen 74 must be sufficiently fine to prevent undried chips from falling through to the receiving well but coarse enough to permit the dried powder to fall through readily. The mesh of the screen is of course subject to wide variations depending upon the particular material under treatment, the size of the chips or flakes being dried, and the speed of rotation of the screen drum, etc. However, it has been found that screens of from twenty-four mesh to four mesh may be employed, a screen of the order of eight mesh being preferable.

The process is particularly applicable to food products, particularly proteinous food products such as beef broth, chicken broth, eggs and milk because of its ability to retain original flavor. However, it is also equally applicable to other biological substances such as serums, blood plasma, etc. Again, the process is applicable to fruit juices but these require rather low temperatures because of the lowering of the melting point as the process proceeds due to sugar concentrations. In the case of some broths such as chicken broth, the fat may first be removed if desired. In treating eggs, they are scrambled prior to treatment and whole milk is preferably first homogenized so as to equally distribute the fat content.

The powdered product obtained by the carrying out of the process may be stored indefinitely at room temperature in the absence of oxygen, as for example in an atmosphere of nitrogen. Upon reconstitution it possesses its original flavor and appearance.

It will be readily understood by those skilled in the art that numerous modifications may be made of the illustrative apparatus disclosed herein, and other types of apparatus for simultaneously removing moisture by sublimation and removing the dried material may be used.

I claim as my invention:

1. The process of dehydrating biological material which comprises drying the same by sublimation of the moisture while in the frozen state and under reduced pressure, and agitating the frozen material while being dried to shake off the dried material substantially as fast as the moisture is removed therefrom, whereby the surface of said frozen material has successive films of dried material formed thereon and removed, until the same is fully dried.

2. The process of dehydrating biological materials which comprises forming the same into frozen flakes or chips, and drying the same under reduced pressure by sublimation of the moisture content from the frozen state while all the while agitating said flakes or chips to remove the dried material from said chips substantially as fast as formed.

3. The process of dehydrating biological material which comprises forming the same into frozen flakes or chips, subjecting the same to conditions for removing the moisture therefrom by sublimation from the frozen state, and simultaneously agitating and screening the same, whereby films of dried material are removed from said chips or flakes substantially as fast as formed and permitted to drop through said screen support.

4. The process of dehydrating biological material which comprises forming the same into small frozen bodies, and agitating and screening said bodies while simultaneously applying infra-red rays to said frozen bodies to supply heat for sublimation of moisture therefrom but without raising the temperature thereof to their melting point, whereby successive films of dried material are formed on said frozen bodies and removed therefrom and withdrawn from the heating zone, substantially as fast as formed.

5. The process of dehydrating biological material which comprises forming the same into small frozen bodies, and agitating and screening said bodies while simultaneously applying infra-red rays to said frozen bodies to supply heat for sublimation of moisture therefrom but without raising the temperature thereof to their melting point, and while simultaneously maintaining said bodies under reduced pressure, whereby successive films of dried material are formed on said frozen bodies and removed therefrom and withdrawn from the heating zone substantially as fast as formed.

6. The process of dehydrating biological material which comprises forming the same into small frozen bodies, and agitating and screening said bodies while simultaneously applying infra-red rays to said frozen bodies to supply heat for sublimation of moisture therefrom but without raising the temperature thereof to their melting point and while simultaneously maintaining said bodies under reduced pressure, whereby successive films of dried material are formed on said frozen bodies and removed therefrom as fast as formed, and shielding the withdrawn dried material from said infra-red rays by the frozen bodies still in course of dehydration.

7. Apparatus for dehydrating biological material from the state of frozen flakes or chips comprising a screen drum having a substantially smooth inner wall adapted to receive the frozen material, means for rotating said drum at moderate speed, infra-red lamp means positioned within the drum for supplying heat for sublimation of moisture from the frozen material, means for maintaining a reduced pressure within the drum and removing the sublimed moisture, means below the drum for collecting dried material removed from the frozen bodies dropping through openings in the screen drum, said collecting means being so located that the dried material received therein is shielded from exposure to rays from the lamp means by frozen bodies in the drum.

8. Apparatus as claimed in claim 7 wherein the rotating screen drum is mounted in an enclosed housing maintained at reduced pressure, and wherein said housing is positioned in a chamber maintained at a temperature of less than substantially 25° F.

9. A process as defined in claim 1 wherein the pressure to which said material is subjected is less than the vapor pressure thereof at temperatures below its melting point.

10. Apparatus for dehydrating small bodies of frozen biological material comprising a rotatable screen drum in which the small bodies of frozen biological material are agitated, means for applying infra-red rays to said frozen bodies during agitation in the drum to supply heat for subliming moisture therefrom, means in the form of a closed housing in which the drum is rotatably mounted subject to a temperature below the melting point of the frozen bodies for maintaining the bodies in frozen condition during application of infra-red rays and into which successive dried films which are formed on and under agitation removed from the frozen bodies drop from the screen drum substantially as fast as formed, and means for maintaining the housing under partial vacuum and removing moisture sublimed from the frozen bodies.

11. Apparatus as described in claim 10 wherein the openings of the screen support are of a size from twenty-four mesh to four mesh.

12. Apparatus as described in claim 10 wherein the openings in the screen drum are of a size of from twenty-four mesh to four mesh and further including means for rotating the screen drum at a speed of less than seven R. P. M.

13. A process as set forth in claim 1 wherein the biological substance is proteinous food material.

14. A process as set forth in claim 1 wherein the biological substance is broth made from animal with an appreciable portion of the fat thereof removed.

15. A process for preparing desiccated proteinous materials is powdered form capable of storage indefinitely during exclusion from air and moisture and capable upon addition of water of being restored in properties to the original proteinous material, which includes freezing the proteinous material, removing the moisture content of said material by sublimation while at constant temperature by application of a vacuum of a pressure between 100 and 2000 microns of mercury, continuing the process of dehydrating until substantially all the moisture content has been removed, collecting the material in a powdered form as it is desiccated, and storing the desiccated product in an atmosphere conducive to bacterial growth and noninjurious to the value of the resultant product.

16. Apparatus for dehydrating biological materials comprising an enclosed chamber, means for maintaining said chamber at a temperature of substantially 25° F. or less, an enclosed housing in said chamber, means for maintaining said housing under reduced pressure and removing water vapor therefrom, a rotatably mounted screen in said housing, means for supplying small bodies of frozen biological material to said drum, means for supplying infra-red rays to the bodies in said drum to supply the heat of sublimation of moisture therefrom, and means for rotating said screen.

17. Apparatus as claimed in claim 16 wherein the pressure maintaining means constitute steam ejector vacuum producing means for maintaining a pressure of less than one thousand microns.

18. Apparatus for dehydrating small bodies of frozen biological material comprising a rotatable screen drum in which the small bodies of frozen biological material are agitated, means for applying infra-red rays to said frozen bodies during agitation in the drum to supply heat for subliming moisture therefrom, and means in the form of a vacuum casing housing the drum subject to a temperature below the melting point of said frozen bodies to maintain the bodies in frozen condition during application of the infra-red rays and into which successive dried films which are formed on and under agitation removed from the frozen bodies drop from the screen drum substantially as fast as formed.

19. Apparatus for dehydrating small bodies of frozen biological material comprising a rotatable screen drum in which the small bodies of frozen biological material are agitated, means for applying infra-red rays to said frozen bodies during agitation in the drum to supply heat for subliming moisture therefrom, means in the form of a vacuum casing housing the drum for rotation therein and into which successive dried films which are formed on and under agitation removed from the frozen bodies drop from the screen drum substantially as fast as formed, and means for maintaining the vacuum casing at a temperature below the melting point of the frozen bodies to maintain the bodies in frozen condition during application of the infra-red rays.

20. Apparatus for dehydrating small bodies of frozen biological material comprising a rotatable screen drum in which the small bodies of frozen biological material are agitated, means for applying infra-red rays to said frozen bodies during agitation in the drum to supply heat for subliming moisture therefrom, means in the form of a vacuum casing housing the drum for rotation therein and subject to a temperature below the melting point of said frozen bodies to maintain the bodies in frozen condition during application of the infra-red rays, and a collecting chamber in said vacuum casing removed from substantial heating influence by the infra-red rays into which dried films successively formed on the frozen bodies and removed during agitation therefrom are discharged from the drum substantially as fast as formed.

21. The process of dehydrating biological material which comprises forming said material into small individual frozen bodies, gradually dehydrating and reducing said bodies by subliming moisture from the surfaces thereof while subjecting said bodies to refrigeration and removing from the frozen bodies dried portions of the material at the surfaces of the bodies as fast as the moisture is removed therefrom.

JAY C. HORMEL.